(12) United States Patent
Kota

(10) Patent No.: US 6,301,742 B1
(45) Date of Patent: Oct. 16, 2001

(54) COMPLIANT FORCE DISTRIBUTION ARRANGEMENT FOR WINDOW WIPER

(76) Inventor: Sridhar Kota, 9391 Quail Ridge Run, Brighton, MI (US) 48116

( * ) Notice: Subject to any disclaimer, the term of this patent is extended or adjusted under 35 U.S.C. 154(b) by 0 days.

(21) Appl. No.: 09/214,638

(22) PCT Filed: Jul. 9, 1997

(86) PCT No.: PCT/US97/12289

§ 371 Date: Jan. 8, 1999

§ 102(e) Date: Jan. 8, 1999

(87) PCT Pub. No.: WO98/01329

PCT Pub. Date: Jan. 15, 1998

Related U.S. Application Data

(63) Continuation-in-part of application No. 08/678,049, filed on Jul. 10, 1996, now abandoned, which is a continuation-in-part of application No. 08/369,803, filed on Jan. 9, 1995, now abandoned.

(51) Int. Cl.[7] .................................................... B60S 1/38

(52) U.S. Cl. ..................................... 15/250.46; 15/250.44; 15/250.361

(58) Field of Search ........................ 15/250.361, 250.43, 15/250.44, 250.451, 250.46, 250.351, 250.452

(56) References Cited

U.S. PATENT DOCUMENTS

| | | | | |
|---|---|---|---|---|
| 3,131,414 | * | 5/1964 | Wise ................................ | 15/250.44 |
| 3,176,337 | * | 4/1965 | Glynn ............................... | 15/250.44 |
| 3,816,870 | * | 6/1974 | Riester .............................. | 15/250.46 |
| 3,928,887 | * | 12/1975 | Lopez et al. ..................... | 15/250.46 |
| 3,978,543 | * | 9/1976 | Tomlin .............................. | 15/250.44 |

(List continued on next page.)

FOREIGN PATENT DOCUMENTS

| | | | |
|---|---|---|---|
| 207820 | * | 6/1955 | (AU) . |
| 822360 | * | 9/1969 | (CA) . |
| 1918917 | * | 10/1970 | (DE) . |
| 477804 | * | 4/1997 | (EP) . |
| 1078066 | * | 8/1967 | (GB) . |
| 1425568 | * | 2/1976 | (GB) . |
| 90/08055 | * | 7/1990 | (WO) . |

*Primary Examiner*—Gary K. Graham
(74) *Attorney, Agent, or Firm*—Rohm & Monsanto, PLC

(57) ABSTRACT

A force distribution arrangement, which is particularly adaptable as a support frame for a windshield wiper support frame (180) for a vehicle, and which can further be provided with an integrally formed windshield wiper blade, is provided with a force input for receiving a directional input force, a force distribution portion resiliently coupled to, and integrally formed with, the force input for transmitting and distributing the directional input force, and a plurality of force output points resiliently coupled to, and integrally formed with, the force distribution portion and the force input. The force output points produce a respective plurality of output forces to the windshield wiper blade, and are translatable with respect to one another along respective paths that are substantially parallel to the direction of the directional input force, and thereby accommodate the curvature of the surface contour of a windshield. A beam member (181) receives at an input thereof at least a portion of the directional input force, and produces at first and second outputs thereof respective ones of first and second output forces. A resilient beam coupling (183,8) portion is integrally formed at the force output point of the beam member. The resilient beam (183,8) coupling portion can be formed substantially as an S-shaped member or a V-shaped member, or the resilient elements can be tiered. Alternatively, the resilient beam coupling portion is formed substantially as a pair of opposingly spaced resilient portions for forming a resilient hinge, the resilient hinge being integrally formed with the beam member.

13 Claims, 6 Drawing Sheets

U.S. PATENT DOCUMENTS

| | | | | |
|---|---|---|---|---|
| 3,995,347 | * | 12/1976 | Kohler | 15/250.43 |
| 4,028,770 | * | 6/1977 | Appel | 15/250.43 |
| 4,102,003 | * | 7/1978 | Hancu | 15/250.44 |
| 4,107,814 | * | 8/1978 | Berg | 15/250.43 |
| 4,127,916 | * | 12/1978 | Berg et al. | 15/250.43 |
| 4,137,598 | * | 2/1979 | Sharp | 15/250.44 |
| 4,592,110 | * | 6/1986 | Verton | 15/250.351 |
| 4,807,326 | * | 2/1989 | Arai et al. | 15/250.43 |
| 4,976,001 | * | 12/1990 | Wright | 15/250.43 |
| 5,042,106 | * | 8/1991 | Maubray | 15/250.201 |
| 5,172,449 | * | 12/1992 | Baumgarten et al. | 15/250.44 |
| 5,236,402 | * | 8/1993 | Eustache et al. | 15/250.351 |

* cited by examiner

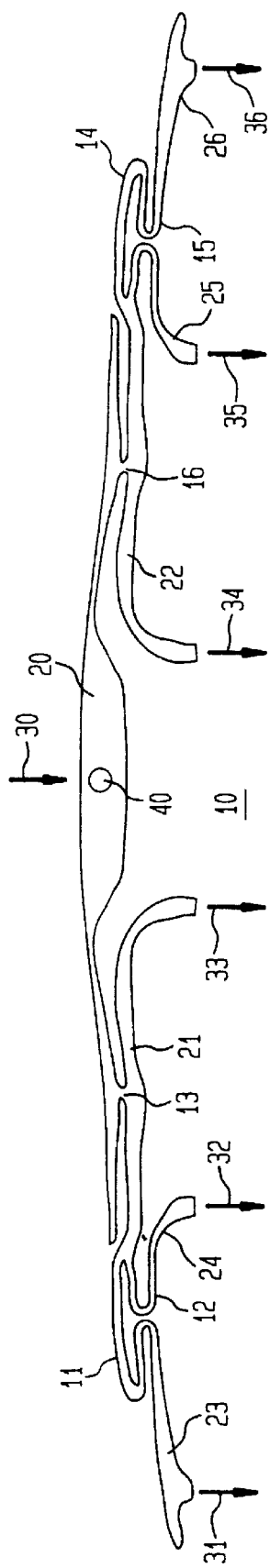
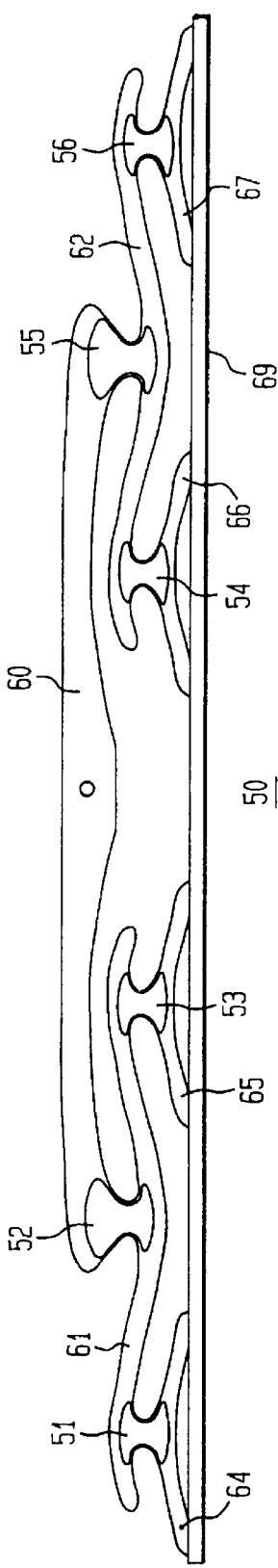

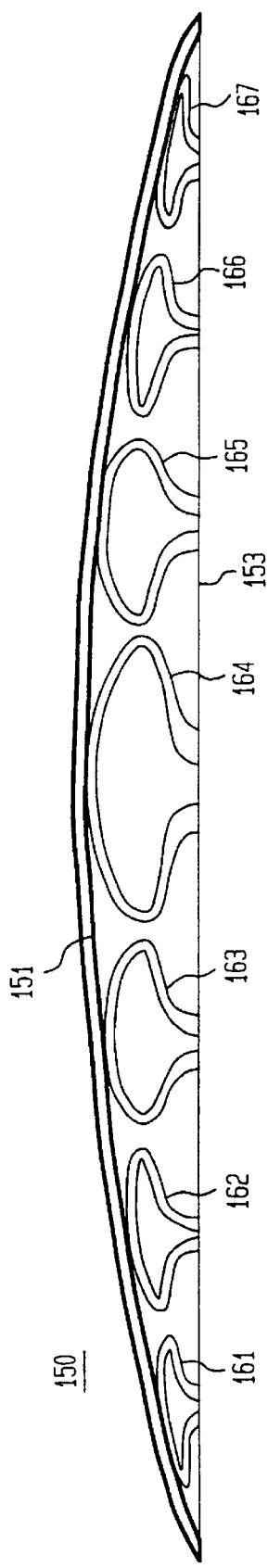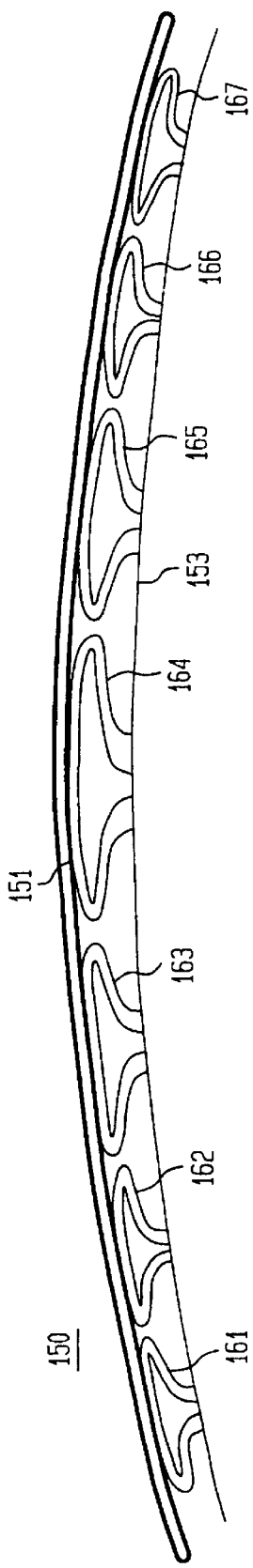

ant or
otherwise coated surfaces move pivotally with respect to one
another. If the coating is installed prior to assembly of the
product, the coating, at least partially as a result of its
thickness, will increase the width of the beams, and decrease
the size of the apertures through which the pivots are
installed On the other hand, if the product is coated after
assembly, the coating process is more complex to avoid
leaving areas uncoated, and of course, the coating will tend
to accumulate at the pivot joints and at the places where the
beams communicate with one another. An overly thick
coating causes interference fits and abrasion of the coating,
while a coating that is too thin will wear prematurely as a
result of exposure to the elements. Clearly, coatings will
produce problems irrespective of the point in the manufacture of the product at which they are applied.

There is a need, therefore, for a windshield wiper support
arrangement that overcomes the problems described
hereinabove, and others.

It is, therefore, an object of this invention to provide a
windshield wiper frame arrangement that is simple and
inexpensive, and which does not require a complex multipivoted interconnection between a windshield wiper actuator arm and the windshield wiper blade.

It is another object of this invention to provide a windshield wiper frame arrangement having precisely controllable compliance characteristics in terms of both, force and
deflection.

It is also an object of this invention to provide a windshield wiper frame arrangement that avoids the need for
mechanical links and joints.

It is a further object of this invention to provide a
windshield wiper frame arrangement that can simply and
inexpensively be manufactured as an integral unit, and that
does not require subsequent painting.

It is additionally an object of this invention to provide a
windshield wiper frame arrangement that can be manufactured in a wide variety of aesthetically pleasing
configurations, while retaining high compliance and strength
characteristics.

It is yet a further object of this invention to provide a
windshield wiper frame arrangement that has a compliance
capacity that can easily and inexpensively be made to
achieve a specific compliance characteristic for a windshield
having a predetermined surface contour, or a group of
windshields having a predetermined range of surface contours.

COMPLIANT FORCE DISTRIBUTION ARRANGEMENT FOR WINDOW WIPER

CROSS REFERENCE TO RELATED APPLICATION(s)

This application is a continuation-in-part patent application of U.S. Ser. No. 08/678,049 filed on Jul. 10, 1996, now
abandoned, which was a continuation-in-part patent application of U.S. Ser. No. 08/369,803 filed on Jan. 9, 1995, now
abandoned.

BACKGROUND OF THE INVENTION

1. Field of the Invention

This invention relates generally to arrangements for distributing an input force to a plurality of predetermined
locations, and more particularly, to an arrangement wherein
an input force, such as that which is applied by a windshield
wiper arm is distributed to a plurality of locations in predetermining magnitudes along a compliant member, such as
a windshield wiper blade.

2. Description of the Related Art

Conventional windshield wiper arrangements employ a
plurality of metallic beams pivotally coupled to one another.
The respective beams, which generally are not resilient or
spring-like, are coupled to a windshield wiper blade at their
free ends, and the pivoting of the beams with respect to one
another approximates compliant bending of the windshield
wiper as it travels across the windshield wiper. One goal to
be achieved, however, is to provide a compliant support
mechanism that, within predeterminable ranges of displacement of the windshield wiper blade in the direction of the
windshield, cause a force to be directed by the windshield
wiper blade substantially uniformly along its length onto the
surface of the windshield, of a magnitude sufficient to
perform the desired windshield wiping function, and for a
given windshield contour.

The conventional windshield wiper support arrangement,
with its plurality of cantilevered beams, cannot achieve a
truly compliant functionality, as it stores within itself little,
if any, potential energy. Instead, the arrangement of pivotally
attached beams merely approximates a truly compliant
mechanism. A further problem with the known arrangements
lies in the fact that the cantilevered beams have a limited
range of displacement in the direction toward the windshield. A beam cannot be displaced beyond the point where
its other end will stop against a sequentially superior beam.
The limitation on the amplitude capacity, and hence on the
simulated compliance effect, places limitations on vehicle
designers, as conventional windshield wiper support systems cannot perform adequately when the windshield surface contour has a relatively small radius of curvature
anywhere in the wiping path.

In addition to failing to achieve a compliant function, the
known windshield wiper support arrangement is implemented at significant complexity and expense. In most cases,
the pivoted beams are made of a metal, that typically is
highly reflective of light and subject to corrosion upon
exposure to the elements. In order to prevent the glare of the
sun on the eyes of the operator of the vehicle, as well as to
protect against corrosion, each such pivoted beam must have
a non-reflective coating applied thereto. This, of course, is
per se a costly step that is rendered more expensive and
critical when it is realized that the coating process must be
executed with accuracy and precision lest the coating material effect adversely the inter-beam pivot couplings. There

SUMMARY OF THE INVENTION

The foregoing and other objects are achieved by this
invention which provides, in accordance with a first windshield wiper arrangement aspect of the invention, a windshield wiper arrangement for a windshield of a vehicle, the
windshield wiper arrangement being coupled to a windshield wiper arm that is coupled at a first end thereof to the
vehicle and at a second end thereof to the windshield wiper
arrangement for applying a force thereto with respect to the
vehicle. The force is applied in a first direction that urges the
windshield wiper arrangement toward the windshield, and a
second force is applied which moves the windshield wiper
arrangement in a second direction across the windshield.
The windshield wiper arrangement has a windshield wiper
blade coupled thereto for communicating with the windshield of the vehicle. In accordance with the invention, the
windshield wiper arrangement is provided with a windshield
wiper blade support system that is integrally formed of a resilient material. The windshield wiper blade support system has a primary beam having first and second and portions arranged axially distal from one another. The primary beam additionally has a central portion between the first and second ends arranged for coupling with the windshield wiper arm. There is additionally provided a plurality of resilient members, each having first and second ends, the first ends of the resilient members being coupled to, and axially along, the primary beam. The second ends thereof are arranged to be compliantly displaceable along respective substantially linear paths of compliance. Each substantially linear path of compliance is substantially parallel to the first direction, and is axially transverse with respect to the primary beam. There additionally is provided a plurality of wiper blade coupling arrangements, each coupled to the second end of a respectively associated one of the plurality of resilient members, for coupling with the windshield wiper blade.

In one embodiment of the invention, there is provided a plurality of resilient interconnection elements integrally formed with the primary beam, each for coupling the second ends of sequentially adjacent ones with the plurality of resilient members to one another. In a further embodiment, a pair of further interconnection elements is further provided for coupling predetermined ones of the second ends of the plurality of resilient members to respective ones of the first and second ends of the primary beam.

In a further embodiment, wherein the windshield wiper is of the type having an elongated blade support extending there among for a length theft corresponds to the distance between the first and second ends of the primary beam, and also has a predetermined width and thickness, each of the wiper blade coupling arrangements is provided with an end pad coupled to the second end of a respectively associated one of the plurality of resilient members. The end pad in this specific illustrative embodiment of the invention has a width that is predetermined in response to the width of the elongated blade support. Additionally, there are provided first and second windshield wiper blade engagement members integrally formed with the respective end pad and extending substantially normal to the end pad for engaging across the width of the elongated blade support.

In a further embodiment, the first and second windshield wiper blade engagement members are disposed in an axially staggered arrangement on the end pad.

In one specific illustrative embodiment of the invention, the resilient members are each configured to form a substantially V-shaped resilient element formed of first and second resilient beams coupled to one another to form a resiliently variable angle therebetween. The substantially V-shaped resilient element has first and second ends. In accordance with this embodiment, there is additionally provided a plurality of first coupling arrangements, each for coupling an associated one of the first ends of the substantially V-shaped resilient elements to the primary beam. A plurality of second coupling arrangements are provided each for coupling an associated one of the second ends to a respectively associated one of the end pads. Each of the substantially V-shaped resilient elements and the associated first and second coupling arrangements are configured whereby an associated one of the end pads is compliantly displaceable along respective counter-arcuate paths defined by respective ones of the first and second resilient beams. The counter-arcuate paths combine to form the respective substantially linear path of compliance that is substantially parallel to the first direction and axially transverse with respect to the primary beam.

In accordance with a further windshield wiper arrangement aspect of the invention, there is provided a windshield wiper arrangement for a windshield of a vehicle, the windshield wiper arrangement being coupled to a windshield wiper arm that is coupled at a first end thereof to the vehicle, a second end of the windshield wiper arm is coupled to the windshield wiper arrangement for applying a force thereto with respect to the vehicle in a direction that urges the windshield wiper arrangement toward the windshield, and which moves the windshield wiper arrangement across the windshield. The windshield wiper arrangement has a windshield wiper blade coupled thereto for communicating with the windshield of the vehicle, and, in accordance with the invention, there is provided a windshield wiper blade support formed of a resilient material. The windshield wiper blade support has a primary beam arranged to couple with the windshield wiper arm. There is additionally provided a first compliant beam having a first end for coupling to the primary beam, a second end for coupling to the windshield wiper blade, and a resilient portion between the first and second ends for bending resiliently in response to a force applied between the primary beam and the windshield wiper blade.

In one embodiment of this second aspect of the invention, the first compliant beam has a substantially elongated configuration with an axis threamoung. The first compliant beam is arranged with respect to the windshield wiper blade whereby a principal component of the force applied by the windshield wiper blade to the first compliant beam is applied substantially transverse to the axis of the first compliant beam.

In an alternative embodiment of the invention, the force applied by the windshield wiper blade to the first compliant beam is applied substantially axially at the second end of the first compliant beam.

In accordance with a further embodiment of the invention, there is additionally provided a first resilient coupling portion for resiliently coupling the first compliant beam to the primary beam. There is additionally provided a second compliant beam coupled to the first compliant beam. In a specific illustrative embodiment of the invention, the second compliant beam is arranged intermediate of the first compliant beam and the windshield wiper blade, and is provided with an arrangement for coupling with the windshield wiper blade.

In a still further embodiment, there is provided a second resilient coupling portion integrally formed with a first compliant beam for resiliently coupling the second compliant beam with the first compliant beam. In this embodiment, the first end of the second compliant beam is adopted to engage with the windshield wiper blade.

In accordance with a further aspect of the invention, a compliant force distribution arrangement is formed by an inventive process, the process including the steps of:

forming a primary beam member;

forming a first compliant beam member integrally with the primary beam member;

forming a plurality of force output portions integrally with said first compliant beam member, said force output portions each being resiliently displaceable in response to the application of a force across said first compliant beam member In one embodiment of this aspect of the invention, the first compliant beam member comprises a resilient element having a substantially S-shaped configuration.

In a further embodiment, there is provided the step of forming, a second compliant beam member resiliently coupled to, and integrally formed with, the first compliant beam member. The first and second compliant beam members form, in this specific illustrative embodiment of the invention, a substantially V-shaped resilient element.

In an alternative embodiment, there is provided the step of forming, a second compliant beam member resiliently coupled to, and integrally formed with, the, first compliant beam member to form a tiered arrangement of resilient elements. Persons of skill in the art can configure multiple-tier resilient beam arrangements that rely on the integrally formed resilient coupling portions to provide the necessary compliance characteristics the relatively firm subordinate beams. Such resilient beams can be tiered, Whereby the overall compliance characteristic of the windshield wiper blade support arrangement is responsive to the resilience characteristics of the beams themselves.

In an advantageous embodiment, the steps of forming a primary beam member, forming a first compliant beam member integrally with the primary beam member, and forming a second compliant beam member integrally with said first compliant beam member are, in one embodiment, performed simultaneously during performance of a step of molding. That is, the process can incorporate the various forming steps in a molding operation Alternatives to the molding step, also wherein the various portions of the apparatus are simultaneously formed, include extrusion, casting, stamping, or any other process of manufacture that, in light of the teaching herein, is deemed appropriate by persons of skill in the art.

Attention on the part of the designer should be directed to the choice of materials, particularly in regard of certain physical and mechanical properties. These include, for example, flexural strength, toughness (i.e., impact strength), percentage of elongation, density, weather resistance, resistance to the effects of ultraviolet light, water absorption, temperature at which heat distortion occurs, resistance to creep, density stability, and dimensional stability. Flexural strength is a measure of the magnitude of a load that can be imposed before the material breaks. The present windshield wiper application requires relatively low flexural strength. The toughness characteristic relates to the magnitude of the energy required to break a plastic material, and is used to measure impact strength. Impact strength is not a measure of the stress required to break a sample, but rather a measure of the energy needed, or absorbed, in breaking the specimen. A relatively large value of impact strength is required in the present windshield wiper application.

The combined effects of temperature, light radiation, moisture, gases, and other chemicals in the environment can cause dimensional and other physical changes in plastic materials. The "weatherability" of a plastic material relates to its ability to withstand direct sunlight, or the application of artificial weathering conditions. Ultraviolet radiation, in conjunction with water and other environmental oxidants, may cause color fading, pitting, crumbling, surface cracking, crazing, or brittleness. Heat stabilizers, that are well-known to persons of skill in the plastics art, can be added to the polymers to retard the damaging effects of neat, light energy, oxidation, or mechanical shear. "Deflection temperature," or "heat distortion temperature," represent the characteristically highest continuous operating temperature that the material will withstand. In the present windshield wiper application, the material should be effective within a range of approximately −50° F. to 150° F.

The compliant, force distributing arrangements of the present invention, in embodiments thereof that are applicable to windshield wiper systems, can be made of a variety of materials. These include, for example, Xenoy (from GE Plastics), low density polyethylene, polypropylene, PVC, aromatic polyesters, polycarbonate, fluoroplastics, ABS, polyallomers, and polystyrene. Some of the referenced materials are considered to be quite (expensive, notwithstanding their excellent mechanical and physical properties. For example, PTFE is about fifty times more expensive than polyethylene.

From the standpoint of economy of manufacture, it is self-evident to persons of skill in the art that, for a given mold configuration, a lower density material will yield more parts per pound. It is necessary, therefore, to compare costs on a unit volume basis. The plastic materials (without limitation), arranged in order of increasing cost per unit volume, are; polyethylene; polypropylene; polystyrene; ABS (polypropylene with 30% glass fill); and PTFE. Polyethylene, preferably of the low density type, or polypropylene, appear to be well-suited for the present windshield wiper application. Both such materials are characterized with low specific gravity (polyethylene is approximately 0.917, and polypropylene is approximately 0.904), excellent molding qualities, very low cost, high impact strength, and low flexural modulus. Although subject to degradation upon exposure to UV radiation, UV absorbers and other additives known to persons skilled in the art can reduce the effects of UV radiation and improve creep resistance.

Polypropylene, polystyrene, and polyethylene do not absorb water and therefore are good candidates for the windshield wiper application. Nylons, polyesters, polycarbonates, and ABS absorb moisture and therefore are not recommended. From the standpoint of cost and flexural strength, polypropylene is a better choice as it costs less than $0.50 per pound and has a flexural modulus of approximately between 100,000 and 150,000 psi Polyacetal (trade name "Delrin") and polyethylene terephthalates (PET) are also good choices.

From the standpoint of manufacture, injection molding, appears preferred, although extrusion is a cost-effective alternative. During molding, care should be taken that a knit line is not produced. A knit line is on along which two fronts of polymer flow meet. Knit lines produce a line of weakness that is susceptible to failure during impact.

BRIEF DESCRIPTION OF THE DRAWINGS

Comprehension of the invention is facilitated by reading the following detailed description, in conjunction with the annexed drawing, in which:

FIG. 1 is a schematic plan view of a windshield wiper support frame embodiment of the invention wherein highly compliant, integrally formed coupling portions are utilized;

FIG. 2 is a schematic plan view of a windshield wiper support frame embodiment of the invention wherein resilient, hinge-like elements are integrally formed with the beams, there being provided eight equally spaced force distribution points;

FIG. 7 is a schematic plan view of an illustrative embodiment of the invention wherein a plurality of resilient coupling elements couple a primary beam to a flexible working beam;

FIG. 8 is a schematic plan view of the embodiment of FIG. 7 showing the flexure of the resilient coupling elements in response to flexure of the flexible working beam toward the primary beam;

DETAILED DESCRIPTION

Figure 3:
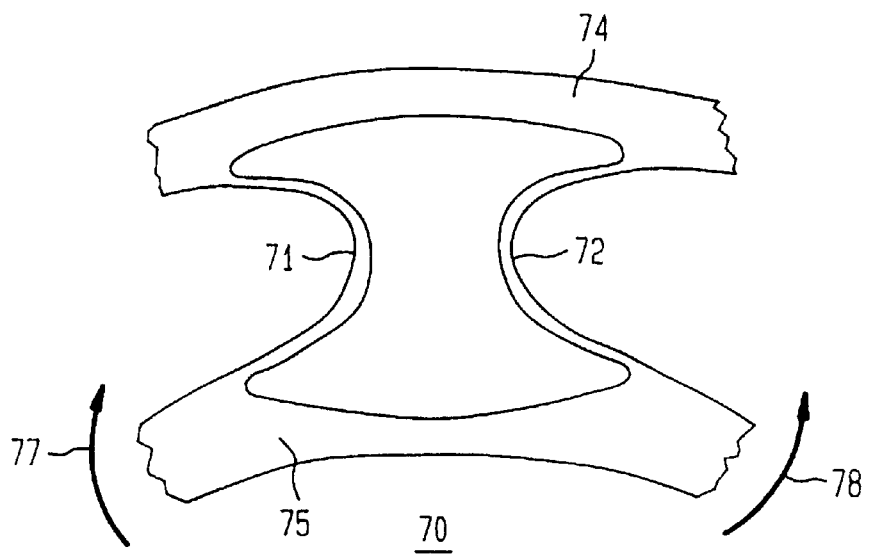
FIG. 3 is a schematic plan view of the configuration of a small resilient, hinge-like element.

FIG. 1 is a schematic plan view of a windshield wiper support frame 10 wherein highly compliant, integrally formed coupling portions 11–16 are utilized for interbeam coupling, as will be described hereinbelow. A primary beam 20 is coupled to a secondary beam 21 via coupling portion 13. Similarly, the primary beam is coupled to a further secondary beam 22 via coupling portion 16. Coupling portion 11 couples secondary beam 21 to a tertiary beam 23. Similarly, on the other half of the windshield wiper support frame, coupling, portion 14 couples secondary beam 22 to a further tertiary beam 26. Coupling portions 12 and 15 are shown to couple their respectively associated secondary beams 21 and 22 to tertiary beams 24 and 25.

In this specific illustrative embodiment of the invention, output forces, which correspond to predeterminable proportions of an input force that is represented by vector 30, are provided at tertiary beams 23–26, and at secondary beams 21 and 22. More specifically, the output forces, that are represented by vectors 31–36, sum up to the magnitude of vector 30. Vectors 31–36 therefore represent a distribution of the input force represented by vector 30. The force represented by vector 30 is supplied in this embodiment by a windshield wiper actuator arm (not shown) that is conventionally coupled to the windshield wiper motor (not shown) of a vehicle (not shown) and to the windshield wiper support frame, illustratively al aperture 40 through primary beam 20. Although not specifically shown in this figure, the terminations of the secondary and tertiary beams where the output forces are provided are adapted (not shown in this figure) in a conventional manner to be coupled to a windshield wiper blade. The windshield wiper blade may be of the conventional single blade type, or of the dual blade type As indicated, the primary, secondary, and tertiary beams, along with their respectively associated compliant coupling portions, are formed integrally with one another. The coupling portions, such as coupling portions 13 and 16, permit their respectively associated secondary beams to pivot. Moreover, terminations of the secondary and tertiary beams where the output forces are produced are translatable along paths that are parallel to the input force vector. Persons of skill in the art will readily recognize that the magnitudes of the forces represented by vectors 31–36 can be made not to be equal to one another, as required by the particular application. Proportions of the force magnitudes amongst the vectors are responsive to the location of the coupling portions along the respective beams, the mechanical properties of the compliant coupling portions, and the mechanical properties of the beams themselves. Persons of skill in the art can configure these characteristics in light of the teaching herein.

FIG. 2 is a schematic plan view of a windshield wiper support frame 50 wherein resilient, hinge-like portions 51–56 are integrally formed with the beams, there being provided eight equally spaced force distribution points. As shown, a primary beam 60 is resiliently coupled via integrally formed resilient coupling portions 52 and 55 to respective secondary beams 61 and 62. Each secondary beam is coupled via respective integrally formed resilient coupling portions 51 and 53, and 54 and 56, to respective tertiary beams 64–67. In this specific illustrative embodiment of the invention, the tertiary beams are coupled to a windshield wiper blade, which is schematically represented in the figure by structural element 69. The windshield wiper blade can, in certain embodiments, be coupled to the force output points of the tertiary beams using any of several known wiper blade coupling arrangements (not shown), or it can be formed integrally with the windshield wiper support frame.

Figure 4:
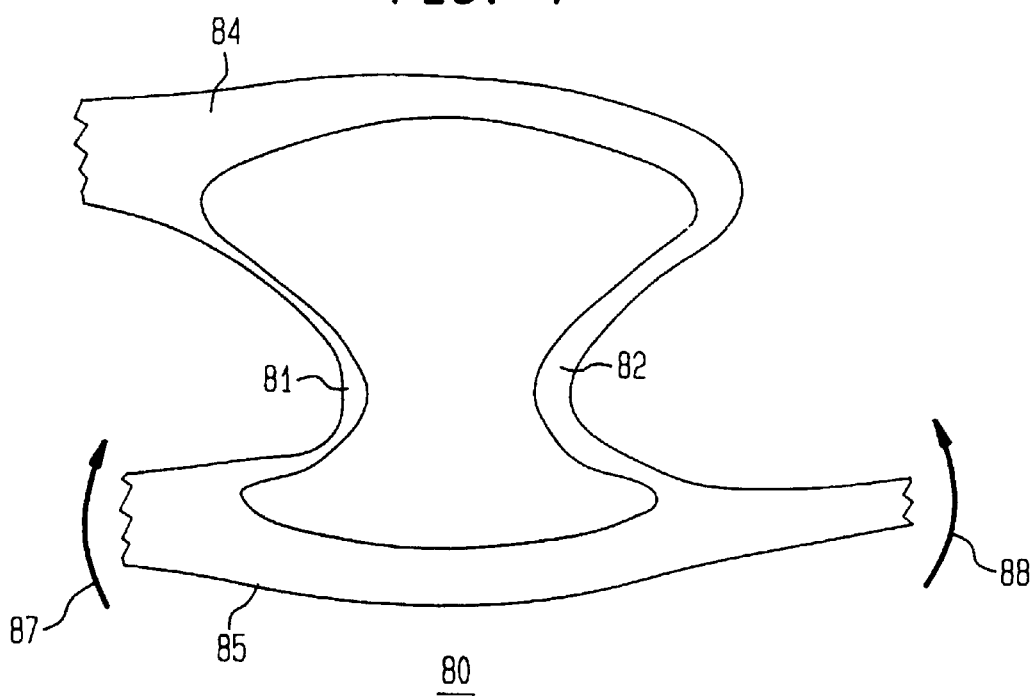
FIG. 4 is a schematic plan view of the configuration of a larger resilient, hinge-like element.

FIG. 3 is a schematic plan representation of the configuration of a small resilient, hinge-like portion 70 which corresponds to coupling portions 51, 53, 54, and 56, shown in FIG. 2. FIG. 4 is a schematic plan view of the configuration of a larger resilient, hinge-like portion 80, which corresponds to coupling portion 55 in FIG. 2. Coupling portion 52 in FIG. 2 is the mirror image of coupling portion 55. Referring once again to FIG. 3, hinge-like portion 70 is formed with first and second resilient members 71 and 72, that couple beams 74 and 75 resiliently to one another. When beam 75 is urged in the direction of arrow 77, first resilient member 71 is subjected to a compression force, and second resilient member 72 is subjected i:o tension. Conversely, when beam 75 is urged in the direction of arrow 78, first resilient member 71 is subjected to a tensile force, and second resilient member 72 is subjected to compression force. In this regard, without limitation, the present invention is distinguishable from the mere pivoting function of the interbeam couplers of the conventional windshield wiper support Frames.

The larger resilient, hinge-like portion 80 of FIG. 4 that corresponds to coupling portion 55 in FIG. 2, functions in a manner similar to the hinge-like portion described with respect to FIG. 3. More specifically, when beam 85 is urged in the direction of arrow 87, first resilient member 81 is subjected to a compression force, and second resilient member 82 is subjected to tension. Conversely, when beam 85 is urged in the direction of arrow 88, first resilient member 81 is subjected to a tensile force, and second resilient member 82 is subjected to compression force.

Figure 5:
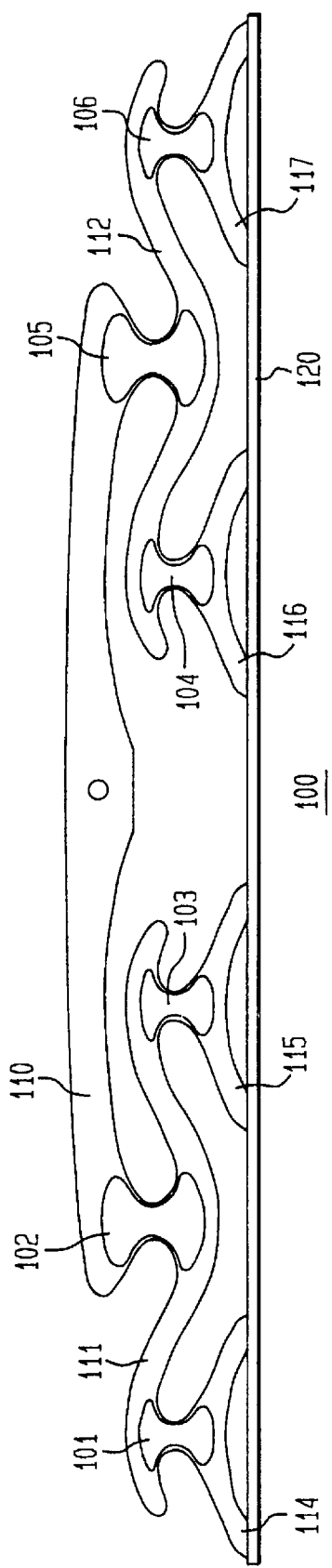
FIG. 5 is a schematic plan view of a windshield wiper support frame embodiment of the invention wherein resilient, hinge-like elements are integrally formed with the beams, with eight equally spaced force distribution points, and with greater flexibility than the embodiment of FIG. 2.

FIG. 5 is a schematic plan view of a windshield wiper support frame 100 embodiment of the invention wherein resilient, hinge-like portions are integrally formed with the beams, with eight equally spaced force distribution points, and with greater flexibility than the embodiment of FIG. 2. As shown in this figure, windshield wiper support frame 100 is provided with resilient, hinge-like portions 101–106 are integrally formed with the beams. A primary beam 110 is resiliently coupled via integrally formed resilient coupling portions 102 and 105 to respective secondary beams 111 and 12. Each secondary beam is coupled via respective integrally formed resilient coupling portions 101 and 103, and 104 and 106, to respective tertiary beams 114–117. The embodiment of FIG. 5 achieves a greater degree of compliance over that of FIG. 2 in that the resilient coupling portions are not only longer, but thinner. Thus, when materials having relatively high stiffness characteristics are employed in the manufacture of the product, desired compliance characteristics can be achieved by controlling the size and thickness of the resilient coupling portions. In this specific illustrative embodiment of the invention, the force output portions (not specifically designated in this figure) are shown schematically to be coupled to a windshield wiper blade 120. As previously noted, the windshield wiper blade can, in certain embodiments, be coupled to the force output points using any of several known wiper blade coupling arrangements, or it can be formed integrally with the windshield wiper support frame.

Figure 6:
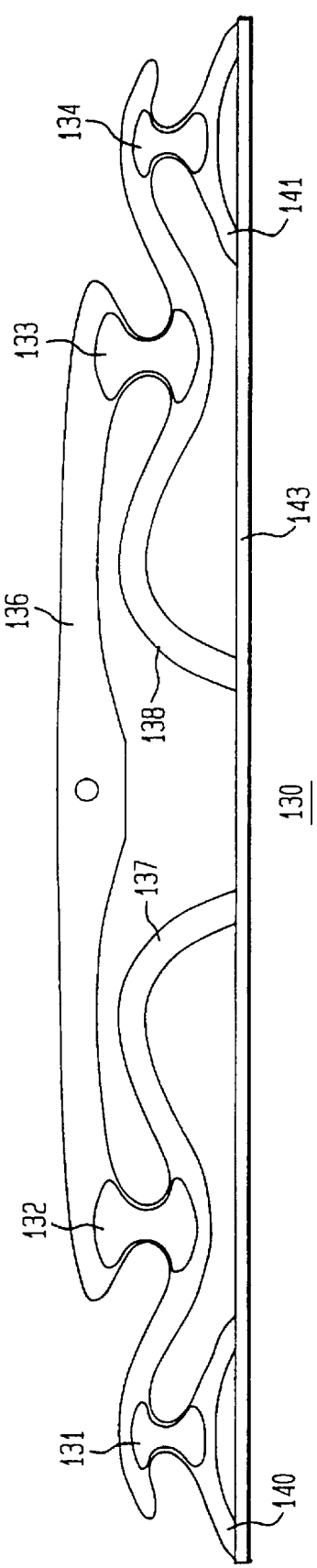
FIG. 6 is a schematic plan view of a windshield wiper support frame embodiment of the invention wherein resilient, hinge-like elements are integrally formed with the beams, there being provided an odd number of unequally spaced force distribution points for each half of the support frame.

FIG. 6 is a schematic plan view of a windshield wiper support frame 130, which is a specific illustrative embodiment of the invention wherein resilient, hinge-like portions 131, 132, 133, and 134 are integrally formed with the beams. In this embodiment, there are provided an odd number of unequally spaced force distribution points for each half of the support frame. More specifically, a primary beam 136 is resiliently coupled via integrally formed resilient coupling portions 132 and 133 to respective secondary beams 137 and 138. Each secondary beam is coupled via respective integrally formed resilient coupling portions 131 and 134 to respective tertiary beams 140 and 141. In this specific illustrative embodiment of the invention, the tertiary beams are coupled to a windshield wiper blade, which is schematically represented in the figure by structural element 143. As previously stated, the windshield wiper blade can, in certain embodiments, be coupled to the force output points of the tertiary beams using any of several known wiper blade coupling arrangements (not shown), or it can be formed integrally with the windshield wiper support frame.

FIG. 7 is a schematic plan view of an illustrative embodiment of a windshield wiper support arrangement 150 constructed in accordance with the invention As shown, a primary beam 151 which in this specific illustrative embodiment of the invention is curved is shown to be coupled resiliently to a flexible working beam 153 by a plurality of resilient coupling elements 161–167. In this specific illustrative embodiment of the invention flexible working beam 153 functions to support a windshield wiper blade (not shown). The resilient coupling elements are distributed over the length of the primary beam and are coupled thereto on the concave side of the curvature. Flexible working beam 153 is shown in this specific illustrative embodiment of the invention to be straight when undisturbed. The variations in the distance between the curved primary beam and the straight flexible working beam is accommodated by employing resilient coupling elements of varying sizes. Thus, resilient coupling, elements 161 and 167 are smaller than resilient coupling elements 162 and 166, etc., resilient element 164 being the largest in this embodiment.

FIG. 8 is a schematic plan view of the embodiment of FIG. 7 showing the flexure of the resilient coupling elements 161–167 in response to a bending flexure in the central region of flexible working beam 153 toward primary beam 151. As shown, as the distance between the primary beam and the flexible working beam is decreased by the application of force (not shown) on the flexible working beam toward the primary beam, resilient coupling elements 16214 166 are shown to become compressed and somewhat elongated along the direction of the primary beam. In this specific illustrative embodiment of the invention, the flexible working beam separates away from the primary beam at its extremities as it is urged toward the primary beam in its central region.

In the embodiment of FIGS. 7 and 8, primary beam 151 is formed so as to be fairly rigid, i.e., that it will not bend significantly in response to the forced contemplated by the designer to be applied thereto and to flexible working beam 153. Resilient coupling elements 161–167 are formed of a resilient material, such as polypropylene, polystyrene, and polyethylene, as described above.

Figure 9:
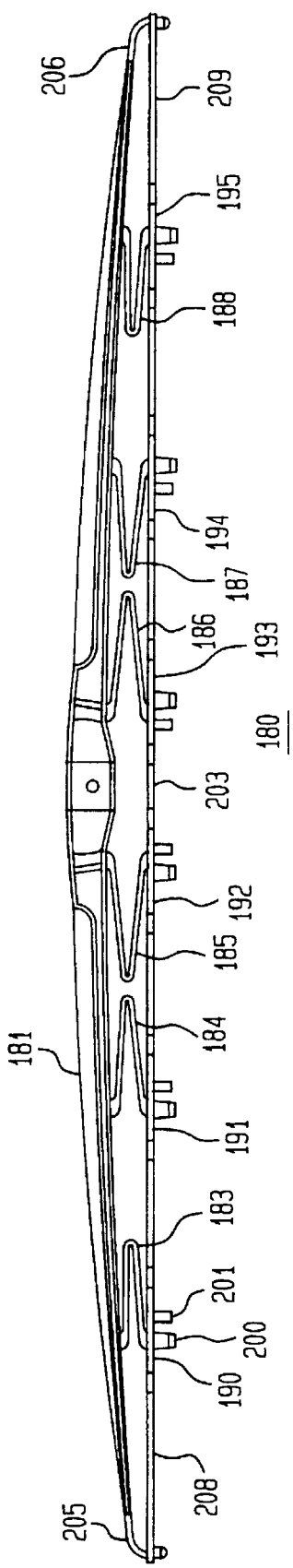
FIG. 9 is a schematic plan view of a further illustrative embodiment of the invention wherein a plurality of resilient coupling elements couple a primary beam to a respective plurality of end pads with blade coupling elements extending therefrom.

FIG. 9 is a schematic plan view of a further illustrative embodiment of a windshield wiper support arrangement 180 constructed in accordance with the invention As shown, a primary beam 181 which in this specific illustrative embodiment of the invention is curved is shown to be coupled resiliently to respective first ends of a plurality of resilient coupling elements 183–188. In this specific illustrative embodiment of the invention, the resilient coupling elements are distributed over the length of the primary beam and are coupled thereto on the concave side of the curvature of primary beam 181. Each of the resilient coupling elements is coupled at a second end thereof to a respective one of end pads 190–195, shown from the side thereof in this figure. Each of the end pads has extending therefrom, in this specific illustrative embodiment of the invention, a pair of blade engagement members, such as engagement members 200 and 201, which will be described in greater detail hereinbelow with respect to FIG. 10.

In the embodiment of FIG. 9, each of end pads 190–195, shown from the side thereof in this figure, is coupled to a sequentially adjacent one of the end pads by a coupling element, in the form of, for example, coupling element 203 which is connected at one end to end pad 192, and at its other end to end pad 193. Primary beam 181 has a first end 205 and a second end 206. In this specific illustrative embodiment of the invention, the respective ends are coupled to their inwardly proximal end pads by coupling elements 208 and 209, respectively. That is, coupling element 208 couples first end 205 to end pad 190, and coupling element 209 couples second end 206 to end pad 195. The end pads are shown in this embodiment to be arranged in a substantially straight-line relation to one another. As shown in FIG. 9, coupling elements 203, 208, 209, and other such coupling elements disposed between end pads 190–191, 191–192, 193–194, and 194–195 (all of which coupling elements are not specifically designated in the figure), with their respectively associated ones of end pads 190–195 form a continuous elongated compliant support element (not specifically designated) that is fixedly coupled at its distal ends (i.e., at the distal most ends of coupling elements 208 and 209) to respective distal ends 205 and 206 of continuous primary beam 181. This facilitates installation of conventional windshield wiper blades. However, curved arrangements for specialized windshield contours can be provided within the scope of the invention. In such specialized embodiments, the windshield wiper blades can themselves be fabricated to have a predetermined curvature that easily would be installed in the correspondingly curved windshield wiper support arrangement.

The variations in the distance between the curved primary beam and the straight flexible working beam is accommodated by employing resilient coupling elements of varying sizes. Thus, resilient coupling elements 183 and 188 are smaller than resilient coupling elements 184 and 187, which are smaller than resilient coupling elements 185 and 186 which are the largest in this embodiment.

Figure 10:
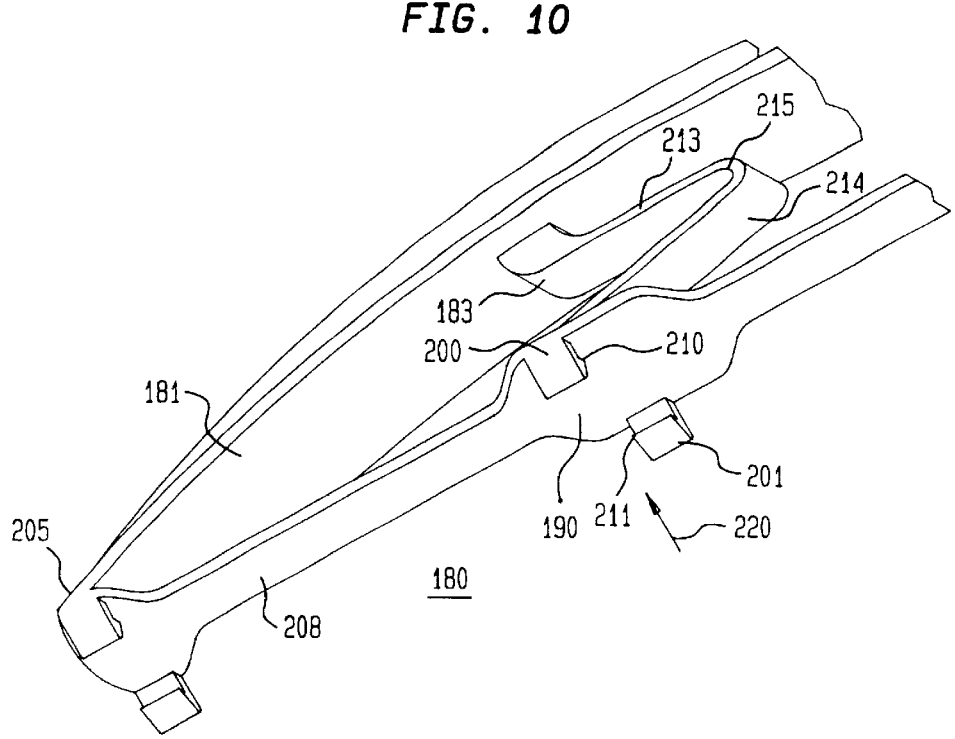
FIG. 10 is an enlarged schematic isometric representation of a portion of the embodiment of FIG. 9 showing certain details of the end pads with the blade coupling elements extending therefrom.

FIG. 10 is an enlarged, fragmented schematic isometric representation of a portion of the embodiment of FIG. 9 showing certain illustrative details of end pad 190 with blade coupling elements 200 and 201 extending therefrom. As shown, end pad 190, as are the other end pads in this embodiment, is wider than the coupling elements, illustratively coupling element 208 which couples end pad 190 to first end 205 of primary beam 181. The blade coupling elements are shown in this specific illustrative embodiment of the invention to be arranged axially offset from one another on the end pad, and are provided with respective inwardly directed protuberances 210 and 211 which engage with an elongated support (not shown) of a conventional windshield wiper blade (not shown).

Resilient element 183 is shown to have a substantially V-shaped configuration, wherein a first end thereof is coupled to primary beam 181, and a second end is coupled to end pad 190. The structure of the resilient element of this specific illustrative embodiment of the invention is comprised of two resilient beams 213 and 214 which are resiliently coupled to one another at a resilient coupling 215. As end pad 190 is displaced toward primary beam 181 by the application of a force in the direction of arrow 220, resilient beams are urged toward one another, effectively counter-rotating about their respective couplings to the primary beam and the end pad. The effective displacement path (not shown) of the end pad in response to the application of the force is substantially linear. In this embodiment, the entire structure is integrally formed by any of a variety of known manufacturing techniques, such as injection molding. A practicable embodiment has been formed of Xenoy, a compound that is commercially available from GE Plastics.

Figure 11:
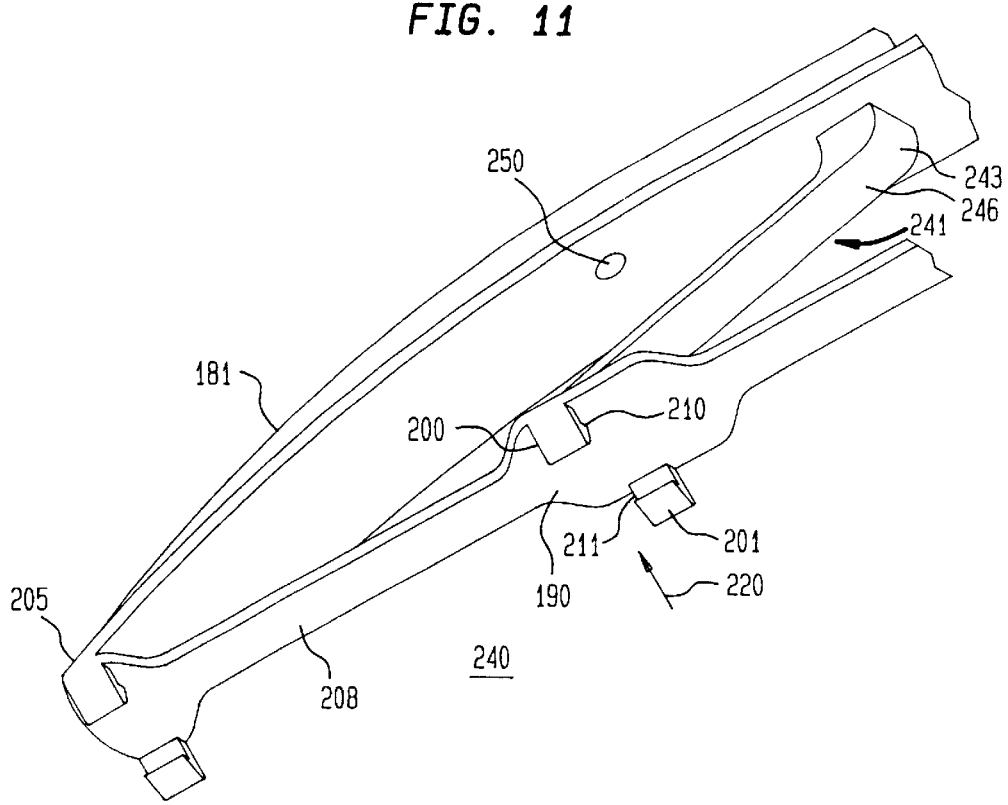
FIG. 11 is an enlarged schematic isometric representation or a portion of a further specific embodiment of the invention showing certain details of the end pads with the blade coupling elements extending therefrom and a single beam resilient element.

FIG. 11 is an enlarged fragmented schematic isometric representation of a portion of a further specific embodiment of the invention showing certain details of the end pads with the blade coupling elements extending therefrom and a single-beam resilient element. Elements of structure that are analogous to those discussed hereinabove with respect to FIG. 10 are similarly designated. FIG. 11 shows, as does FIG. 10, certain illustrative details of end pad 190 with blade coupling elements 200 and 201 extending therefrom. As shown in FIG. 11, end pad 190 as are the other end pads (not shown) in this embodiment, is wider than the coupling elements, illustratively coupling element 208 which couples end pad 190 to first end 205 of primary beam 181. As previously discussed, the blade coupling elements are shown in this specific illustrative embodiment of the invention to be arranged axially offset from one another on the end pad, and are provided with respective inwardly directed protuberances 210 and 211 which engage with an elongated support (not shown) of a conventional windshield wiper blade (not shown).

In the various embodiments of the invention, a plurality of apertures, such as aperture 250, are be provided through primary beam 181 to permit high speed air to flow therethrough during vehicle operation. Such air flow will impinge upon the windshield wiper blade urging same toward the windshield (not shown).

A resilient element 241 is shown in the embodiment of FIG. 11 to have a substantially S-shaped configuration, wherein a first end thereof is coupled to primary beam 181, and a second end is coupled to end pad 190. The structure of the resilient element of this specific illustrative embodiment of the invention is comprised of two resilient bends 243 and 244 which are resiliently interconnected by a resilient beam 246. As end pad 190 is displaced toward primary beam 181 by the application of a force in the direction of arrow 220, resilient beam 246 is caused to bend resiliently. In this embodiment, the entire structure is integrally formed, as previously noted.

In addition, persons of skill in the art can configure multiple-tier resilient beam arrangements, similar in appearance to the embodiment shown in FIG. 2, but instead of relying on the integrally formed resilient coupling portions (e.g., 51 and 53) to provide the necessary compliance to the relatively firm subordinate beams (e.g., 61 and 64), resilient beams of the type described in connection with FIGS. 9–11 can be tiered (not shown), whereby, as previously stated, the overall compliance characteristic of the windshield wiper blade support arrangement is responsive to the resilience characteristics of the beams themselves. In still further embodiments, the resilient coupling elements, such as coupling element 208 which couples end pad 190 to first end 205 of primary beam 181 in FIGS. 9–11, can themselves be configured to distribute force to the windshield wiper blade (not shown), in regions intermediate of the end pads. In such embodiments, the resilient connectors between the end pads, or between an end pad and an end of the primary beam, has a preformed curvature that applies a resilient force to the windshield wiper blade.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A windshield wiper arrangement for a windshield of a vehicle, the windshield wiper arrangement being coupled to a windshield wiper arm that is coupled at a first end thereof to the vehicle and at a second end thereof to the windshield wiper arrangement for applying a force thereto with respect to the vehicle in a first direction that urges the windshield wiper arrangement toward the windshield and which moves the windshield wiper arrangement in a second direction across the windshield, the windshield wiper arrangement having a windshield wiper blade coupled thereto for communicating with the windshield of the vehicle, the windshield wiper arrangement further comprising:

a windshield wiper blade support system integrally formed of a resilient material, the windshield wiper blade support system having:

a continuous primary beam that is continuous between first and second end portions arranged axially distal from one another, and further having a central portion therebetween arranged for coupling with the windshield wiper arm;

a strap member that is continuous between first and second end portions thereof, said first and second end portions being coupled to respective ones of the first and second end portions of said continuous primary beam, said strap member being highly compliant in response to the force applied with respect to the vehicle in the first direction, and substantially less compliant in the second direction across the windshield;

a plurality of resilient members, each having first and second ends, the first ends of each of said resilient members being coupled directly to said primary beam at predetermined fixed locations therealong, and the second ends of each of said resilient members being coupled directly to said strap member at predetermined fixed locations therealong, said resilient members being arranged to be compliantly displaceable along a respective substantially linear path of compliance, the substantially linear path of compliance being substantially parallel to the first direction and axially transverse with respect to said primary beam, and substantially less compliant in the second direction across the windshield; and a plurality of wiper blade coupling arrangements each coupled to said strap member at predetermined fixed locations therealong, for coupling slidingly with the windshield wiper blade.

2. The windshield wiper arrangement of claim 1, wherein said strap member comprises a plurality of resilient interconnection elements integrally formed with said primary beam each for coupling the second ends of sequentially adjacent ones of said plurality of resilient members to one another.

3. The windshield wiper arrangement of claim 2, wherein said strap member comprises a pair of further resilient interconnection elements for coupling respectively associated ones of the second ends of said plurality of resilient members to respective ones of the first and second ends of said primary beam.

4. The windshield wiper arrangement of claim 1, wherein the windshield wiper is of the type having an elongated blade support extending therealong for a length dimension that corresponds to the distance between the first and second ends of said primary beam, and a predetermined width and thickness, and each of said wiper blade coupling arrangements comprises:

an end pad coupled to said strap member in the vicinity of the second end of a respectively associated one of said plurality of resilient members, said end pad having a width that is predetermined in response to the width of the elongated blade support; and first and second windshield wiper blade engagement members integrally formed with said end pad and extending substantially normal to said end pad for engaging across the width of the elongated blade support.

5. The windshield wiper arrangement of claim 4, wherein said first and second windshield wiper blade engagement members are staggered on said end pad.

6. The windshield wiper arrangement of claim 4, wherein said resilient members each comprise a substantially V-shaped resilient element formed of first and second resilient beams coupled to one another to form a resiliently variable angle therebetween, said substantially V-shaped resilient element having first and second ends, said first and second ends of said V-shaped resilient element being relatively rigid in a direction transverse to the resiliently variable angle.

7. The windshield wiper arrangement of claim 6, wherein there is further provided:

a plurality of first coupling arrangements each for coupling an associated one of the first ends of said substantially V-shaped resilient elements to said primary beam; and a plurality of second coupling arrangements each for coupling an associated one of the second ends of said to a respectively associated one of said end pads.

8. The windshield wiper arrangement of claim 7, wherein each of said substantially V-shaped resilient elements and associated ones of said first and second coupling arrangements are configured whereby an associated one of said end pads is compliantly displaceable along respective counter-arcuate paths defined by respective ones or the first and second resilient beams, the counter-arcuate paths combining to form the respective substantially linear path of compliance that is substantially parallel to the first direction and axially transverse with respect to said primary beam and defined by the respectively associated points of coupling to said primary beam and said end pads.

9. A windshield wiper arrangement for a windshield of a vehicle, the windshield wiper arrangement being coupled to a windshield wiper arm that is coupled at a first end thereof to the vehicle and at a second end thereof to the windshield wiper arrangement for applying a force thereto with respect to the vehicle in a direction that urges the windshield wiper arrangement toward the windshield and which moves the windshield wiper arrangement across the windshield, the windshield wiper arrangement having a windshield wiper blade coupled thereto for communicating with the windshield of the vehicle, the windshield wiper arrangement further comprising:

a windshield wiper blade support formed of a resilient material, the windshield wiper blade suppose having:

a continuous primary beam arranged to couple with the windshield wiper an said continuous primary beam being substantially coextensive with the windshield wiper blade, an elongated compliant support element fixedly coupled at its distal ends to respective distal ends of said continuous primary beam, a first compliant beam having a first end for coupling to said continuous primary beam, a second end, and a resilient portion between said first and second ends for bending resiliently in response to a force applied between said primary beam and said elongated compliant support element;

a first resilient coupling portion for resiliently coupling said first compliant beam to said continuous primary beam; and a second compliant beam coupled to said first compliant beam, said second compliant beam being arranged intermediate of said first compliant beam and said elongated compliant support element, and being further provided with means for coupling with said elongated compliant support element.

10. The windshield wiper arrangement of claim 9, wherein said first compliant beam has a substantially elongated configuration with an axis therealong, said first compliant beam being arranged with respect to the windshield wiper blade whereby a principal component of the force applied by the windshield wiper blade to said first compliant beam is applied substantially transverse to the axis of said first compliant beam.

11. The windshield wiper arrangement of claim 9, wherein said first compliant beam has a substantially elongated configuration with an axis therealong, said first compliant beam being arranged with respect to said elongated compliant support element whereby a principal component of the force applied by said elongated compliant support element to said first compliant beam is applied substantially axially at said second end of said first compliant beam.

12. The windshield wiper arrangement of claim 9, wherein there is further provided a second resilient coupling portion integrally formed with said first compliant beam for resiliently coupling said second compliant beam with said first compliant beam.

13. The windshield wiper arrangement of claim 12, wherein said elongated compliant support element in the vicinity of the coupling thereto of said first end of said second compliant beam is provided with means for coupling with the windshield wiper blade.

* * * * *